United States Patent
Ritter (10) Patent No.: US 9,641,693 B2
(45) Date of Patent: May 2, 2017

(54) CHIP CARD WITH INTEGRATED TIME-DETERMINING SYSTEM

(75) Inventor: R. Ritter, Rollikofen (CH)

(73) Assignee: SWISSCOM AG, Bern (CH)

( * ) Notice: Subject to any disclaimer, the term of this patent is extended or adjusted under 35 U.S.C. 154(b) by 2846 days.

(21) Appl. No.: 09/962,901

(22) Filed: Sep. 25, 2001

(65) Prior Publication Data

US 2002/0082992 A1    Jun. 27, 2002

Related U.S. Application Data

(63) Continuation of application No. PCT/CH99/00129, filed on Mar. 26, 1999.

(51) Int. Cl.

| | |
|---|---|
| *H04M 15/00* | (2006.01) |
| *H04M 15/18* | (2006.01) |
| *G01S 19/14* | (2010.01) |
| *G01S 19/35* | (2010.01) |
| *G06K 19/07* | (2006.01) |
| *G06Q 20/10* | (2012.01) |
| *H04W 4/24* | (2009.01) |
| *H04W 88/02* | (2009.01) |
| *H04W 92/08* | (2009.01) |
| *H04W 4/02* | (2009.01) |
| *H04W 64/00* | (2009.01) |

(52) U.S. Cl.
CPC ............ *H04M 15/00* (2013.01); *G01S 19/14* (2013.01); *G01S 19/35* (2013.01); *G06K 19/07* (2013.01); *G06K 19/0719* (2013.01); *G06Q 20/105* (2013.01); *H04M 15/18* (2013.01); *H04W 4/24* (2013.01); *H04W 88/02* (2013.01); *H04W 92/08* (2013.01); *H04W 4/02* (2013.01); *H04W 64/00* (2013.01)

(58) Field of Classification Search
CPC ....... G06Q 40/00; G06C 40/00; H04M 15/00; H04M 15/18
USPC .......................................... 705/35
See application file for complete search history.

(56) References Cited

U.S. PATENT DOCUMENTS

| | | |
|---|---|---|
| 5,335,276 A | 8/1994 | Thompson et al. |
| 5,546,445 A | 8/1996 | Dennison et al. |
| 5,629,981 A | 5/1997 | Nerlikar |
| 5,724,316 A * | 3/1998 | Brunts ........................... 368/10 |
| 5,748,720 A * | 5/1998 | Loder ........................ 455/406 |

(Continued)

FOREIGN PATENT DOCUMENTS

| | | |
|---|---|---|
| EP | 0 902 552 A1 | 3/1999 |
| WO | WO/97/40616 | 10/1997 |
| WO | 9858510 | 12/1998 |

OTHER PUBLICATIONS

European Search Report for EP07111144, dated Jan. 8, 2008, 2 pages.

*Primary Examiner* — Eric T Wong
(74) *Attorney, Agent, or Firm* — McAndrews, Held & Malloy, Ltd.

(57) ABSTRACT

Billing method for billing a call to a user identified with an identification card (2) in a telecommunication network. The duration of the calls is determined by a GPS receiver. The identification card further preferably comprises downloaded scales of charges, the billed amount depending on the determined duration of the call and on the stored scales of charges.

Advantage: the determined time can not be falsified by the user.

127 Claims, 4 Drawing Sheets

(56) References Cited

U.S. PATENT DOCUMENTS

| | | | | |
|---|---|---|---|---|
| 5,861,841 A | * | 1/1999 | Gildea | G01S 19/35 342/357.31 |
| 5,915,226 A | * | 6/1999 | Martineau | G06Q 20/32 379/114.2 |
| 6,324,404 B1 | * | 11/2001 | Dennison | 455/456 |
| 6,493,550 B1 | * | 12/2002 | Raith | H04M 15/765 455/41.2 |
| 6,516,190 B1 | * | 2/2003 | Linkola | 455/408 |
| 6,539,229 B1 | * | 3/2003 | Ali | 455/456 |

\* cited by examiner

CHIP CARD WITH INTEGRATED TIME-DETERMINING SYSTEM

This application is a continuation application of PCT/CH99/00129 filed on Mar. 26, 1999.

FIELD OF THE INVENTION

The present invention concerns a chip card, for example a SIM card, with an integrated time-determining system. The invention furthermore concerns a billing method that can be carried out with a corresponding chip card.

RELATED ART

In telecommunication networks, for example in telecommunication networks according to the GSM standard, the connection fee to be billed depends on various parameters, among others on the duration of the connection, on the time of day and on the geographic location of the calling user and of the called user. These parameters are mostly determined within the infrastructure of the net, for example in a billing center. From these parameters the connection fee is computed and debited to the user's account with the network operator or with a financial institute. This billing method is extremely elaborate and costly for the network operator and necessitates a complex billing method and many manual or semi-manual operations.

Patent document EP656733 describes a billing method for mobile devices, wherein all connection parameters necessary for computing the fee are stored in the memory of the mobile device. This amount can then be shown for information purposes on the display of the mobile device. It is however not described in this document how the computed fee can be billed automatically. Furthermore, the connection duration and time are determined with the help of the internal watch of the mobile device. The network operator does not have any influence on the accuracy of the watch in the mobile devices offered by other manufacturers. This watch can be set in most mobile devices by the users, so that misuse by setting the clock to a cheaper rate time is easily possible.

Patent document FR2680261 describes a telephone chip card containing a pre-paid account as well as scales of charges. The billed fees for the connection are settled from the pre-paid account according to the connection duration and the stored charges. The time and duration of the connections are also determined by an external device.

Patent application PCT/CH97/00472 describes a billing method for billing a call to a user identified with an identification card in a telecommunication network. In this billing method, the duration of the call is measured by a quartz oscillator integrated into the identification card. The billed amount is then computed according to the determined duration of the call and to at least one of the scales of charges stored in the identification card.

In this way, the most important parameters for computing the billed amount can be directly determined on the card, so that the billing can be effected directly at the source of the user. The established amount can then be debited either directly from a pre-paid account on the identification card and/or be parceled into a billing receipt and sent to a debit server in the telecommunication network.

Chip cards with an integrated quartz oscillator are, however, difficult to manufacture and have a short life span, so that they are also expensive. Furthermore, the chip cards described in this application only allow the establishment of the calling time and duration, but not, however, of the location of the calling users.

WO97/40616 describes another SIM card with a pre-paid account as well as a watch for determining the duration of a call. In one embodiment, the pre-paid account can also be debited with impulses from the net. The clock is powered by a source of electricity outside the chip card; the time can thus be falsified by temporarily not feeding the chip card.

Patent application CH98/00367 describes an identification card for users of a mobile radio telephone, wherein all the components of a time-determining device are contained excepting the quartz. The integrated time-determining device is synchronized by an external frequency signal, for example from a quartz in the mobile device. Furthermore, the time set can be checked at any time by a time server in the network, and, if necessary, be corrected. In this way, various mechanisms allow to check the accuracy and the operation of the time-determining device from the time server in the network.

This method cannot prevent the time from being falsified by the user between two corrections. Furthermore, the chip card described in this application only allows the establishment of the calling time and duration, but not, however, of the location of the users.

U.S. Pat. No. 5,546,445 describes a mobile telephone with an integrated GPS receiver. The location information is sent to a brokerage firm and used for computing the amount to be billed. This system is not suitable for pre-paid solutions.

It is therefore an aim of the invention to propose a chip card with a improved integrated time-determining system.

It is another aim to propose a new chip card with an integrated time-determining system that can be used for secured applications wherein a non-falsifiable time determination is necessary.

BRIEF SUMMARY OF THE INVENTION

According to the invention, these aims are achieved by means of the device described in the independent device claim and by the method described in the independent method claim, preferred embodiments being further described in the dependent claims.

Specifically, these aims are achieved by means of a method wherein the duration of the connection, or the duration of other billed processes, is determined with a time indication determined by a GPS receiver. This GPS receiver comprises for example an antenna, a high-frequency circuit and a digital processing circuit, all or only certain of these components being integrated in the chip card.

Thus, all the necessary parameters needed for computing the billed amount can be determined directly in the chip card, so that the billing can be effected directly at the source, with the user. GPS signals are very hard to falsify so that the system can guarantee a high degree of security.

DESCRIPTION OF THE DRAWINGS

The present invention will be better understood with the aid of the description given by way of example and illustrated by the drawings, in which.

DETAILED DESCRIPTION OF THE INVENTION

Figure 1:
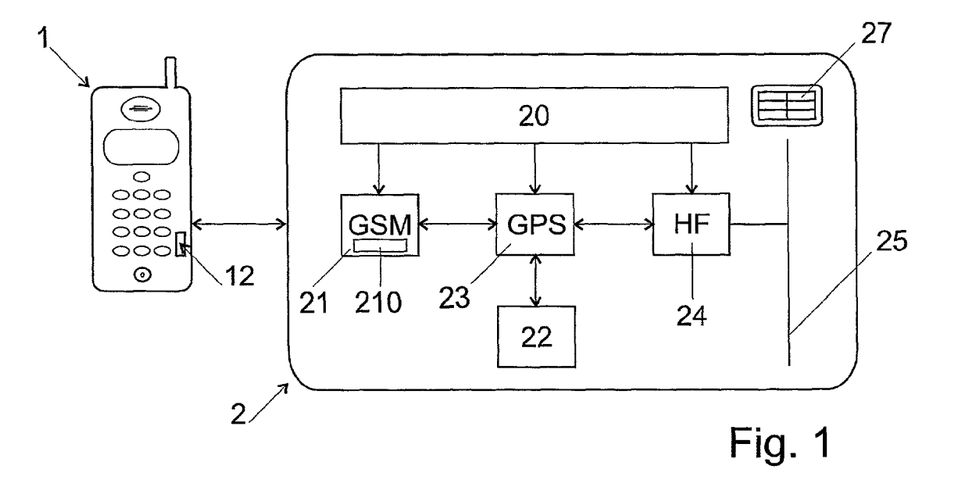
FIG. 1 represents a block diagram with an identification card in a first embodiment of the invention and a conventional terminal.

FIG. 1 shows a block diagram of a system with a terminal 1 and an identification card 2. The terminal 1 can be, for example, a digital mobile radio telephone, for example a GSM or a UMTS mobile radio telephone or a palmtop or laptop with a communication interface and a chip card reader. The terminal 1 could also be a telecommunication terminal, for example a telephone or a computer connected to a fixed network, for example a telephone network or a PLC (Power Line Communication) network, in which the users are identified with a personal chip card.

The identification card 2, for example a SIM (Subscriber Identity Module) card 2, can be connected to the terminal to identify the user in a telecommunication network. Conventional SIM cards are already now used among others in GSM and UMTS mobile devices. The SIM card is preferably a full-size card (ISO); it is connected through a contact area 27 on the card's surface with the terminal 1. Other card formats and contactless cards can, however, also be used in the framework of this invention. The SIM card 2 contains data processing means 21, for example a known GSM-SIM micro-controller. SIM cards are for example described in the technical specifications GSM 11.11 and GSM 11.14 that have been available since 1995, 1996 respectively, with the Secretary's Office of the European Telecommunications Standard Institute, F-06921 Sophia Antipolis. Other identification cards, for example multiple purpose cards, known by the term Opencard, or JAVA cards can also be used in this invention.

According to the invention, the SIM card 2 further contains a receiver for signals sent by a satellite constellation in a location-determining system, for example a GPS system. The receiver comprises a radio frequency front-end circuit 24, an integrated digital processor 23 and an integrated GPS antenna. The digital processor 23 as well as the front-end circuit are each integrated in a chip. The circuits 23 and 24 are both powered preferably by a source of energy 20 (accumulator or capacitor, for example) contained in the card 2, at least when the terminal 1 is switched off. The feed voltage is preferably 3.3 volts or less in order to limit the power consumption.

The front-end circuit 24 consists preferably of an ASIC that transforms the GPS signal with a frequency of about 1.575 GHz into a signal with a lower frequency that can be processed by the digital processor 23. The circuit 24 is preferably realized with bipolar transistors, or with another fast technology. The front-end circuit can comprise possibly also an amplifier for the signal from the antenna 25.

The digital circuit 23 comprises for example a universal processor or preferably a signal processor (DSP) that can be realized with CMOS or another energy-saving technology, as well as a ROM, a RAM and possibly some correlators. With a known firmware in the ROM, the processor can process in the circuit 23 the signals from the circuit 24 and determine from these signals a time indication and possibly a location indication.

An oscillator 22, for example a quartz oscillator, a LC oscillator or an oscillator capable of generating an electric frequency from an interference between two optical frequencies of a laser, is also integrated in the card 2 in this embodiment. The frequency generated by the oscillator 22 is used among others for scanning the GPS frequencies.

The antenna 25 in this embodiment of the invention is also integrated in the chip card 2. In this embodiment, the card contains all the components of a GPS receiver and can also determine the time and the location when not connected to the mobile device. Since all the components of the GPS receiver are integrated in the card 2, it is furthermore very difficult for a falsifier to falsify the set time or location.

The digital circuit 23 is connected with a conventional GSM processor 21. The time and location information determined by the GPS receiver is delivered to the GSM processor 21. With this time indication, the processor 21 can establish the absolute time and the duration of certain processes in the card 2, for example the duration of a telephone connection. The GSM processor 21 further comprises preferably scales of charges, with which it can compute the telecommunication fees depending on the time, the duration of the connection and/or the location of the user. These scales of charges are preferably downloaded by means of cryptographically signed and encrypted SMS or USSD messages from a tariff server administrated by the network operator; they are stored in a secure part 210 of the processor 21 so that they cannot be modified by the user. The processor checks whether the received scales of charges have really been signed by an authorized network operator. Swiss patent application N° 367/98 describes other methods to set the time when logging the SIM card into the communication network.

In this way, the computed amount can be shown immediately on the display of the mobile device 21 and debited from a prepaid SIM card on a pre-paid account or be parceled into a billing receipt and sent to a finance and public service firm (bank or network operator). The card according to the invention can however also be used to measure the duration of other processes in the card 2, for example the duration of certain services or applications or the usage of resources not required for traffic handling.

It is furthermore possible to use the chip card according to the invention for other applications than mobile radio telecommunication. Such chip cards can for example also be used in pay-TV systems or in networked computers, for example to establish a time-of-use dependent bill that depends on the time of use, the duration of use and/or the location of the user. The chip card 2 can also be used as an identification card in a fixed network or a PLC (Power Line Communication) network, in which the users are identified with personal chip cards.

In the framework of this invention, the processor 21 can also be a known JAVA processor that can contain for example also WAP (Wireless Application Protocol) modules for connecting the card 2 to the Internet. It is also possible in the framework of this invention to integrate for example the GSM processor 21 and the digital circuit 23 in a single chip.

The GPS circuit preferably uses the time and location information received from the mobile device and from the mobile radio network to synchronize faster and also in difficult reception conditions with the received digital GPS signal.

In one embodiment, the SIM card 2 uses the time and location information from the mobile device and/or the mobile radio network, for example from the base station, if it cannot receive a GPS signal, for example inside buildings. In this case, the time is set automatically only if the card can receive a new time indication from a GPS satellite. The use of the card can be automatically blocked with a special application if the card is not set within a certain time limit.

Figure 2:
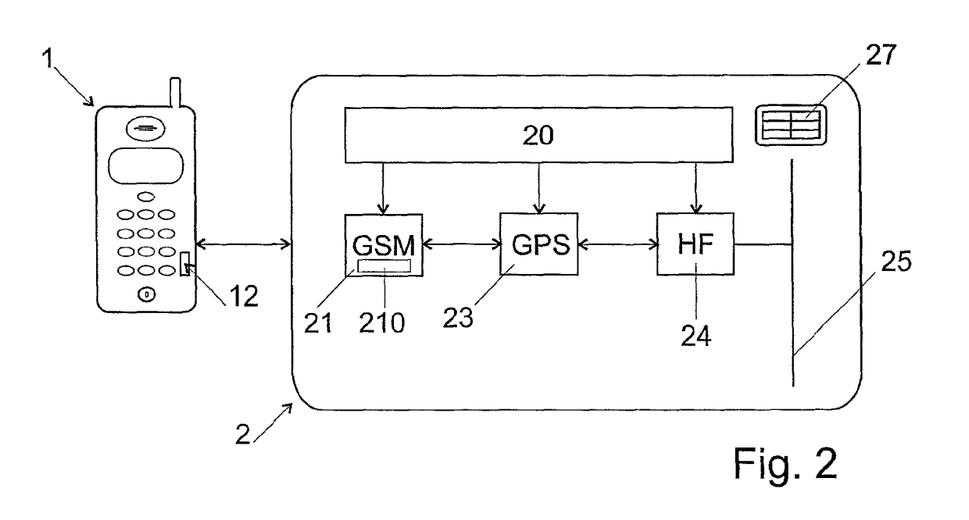
FIG. 2 represents a block diagram with an identification card in a second embodiment of the invention and a conventional terminal.

FIG. 2 shows a block diagram of an identification card 2 in a second embodiment of the invention. In this embodiment, the card 2 does not contain its own oscillator for scanning the GPS frequencies, but to this end uses the quartz oscillator 12 contained anyway in most mobile devices 1. In this embodiment, the card does not work if it is not connected to a mobile device. The determined time cannot however be falsified by a simple manipulation of the mobile device or with a replacement of the quartz 12, so that this embodiment of the invention guarantees the same security as the first mentioned embodiment of the invention.

Figure 3:
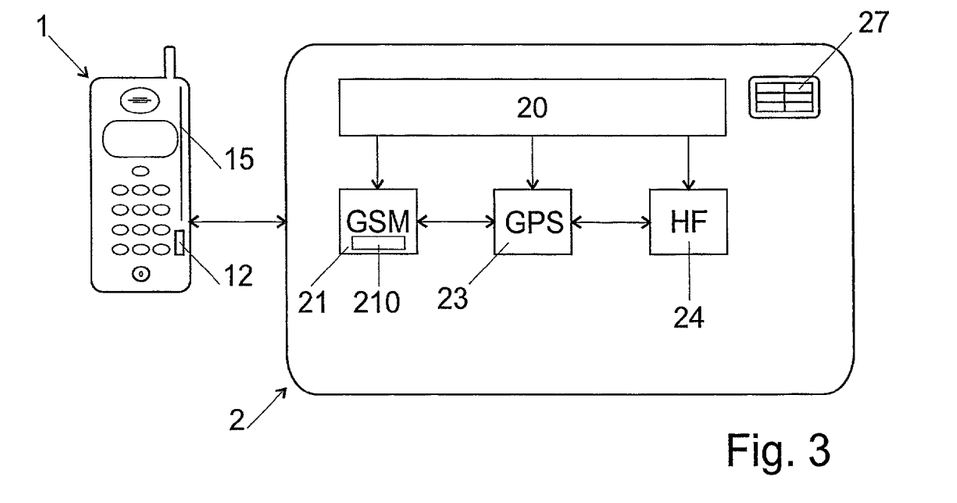
FIG. 3 represents a block diagram with an identification card in a third embodiment of the invention and a conventional terminal.

FIG. 3 shows a block diagram of an identification card 2 in a third embodiment of the invention. In this embodiment, the card also uses the quartz oscillator 12 of the mobile device. Furthermore, it does not comprise a GPS antenna but uses an antenna integrated into the mobile device 1, the received signal being transmitted over the contact area 27 to the radio-frequency circuit 24. This embodiment allows to use a better, bigger antenna and furthermore to mount the antenna outside the casing of the mobile device or in the casing of the plug-in battery, thus solving the problem of the attenuation of the GPS signal inside the casings. However, this embodiment will only work with mobile devices having a GPS antenna.

Figure 4:
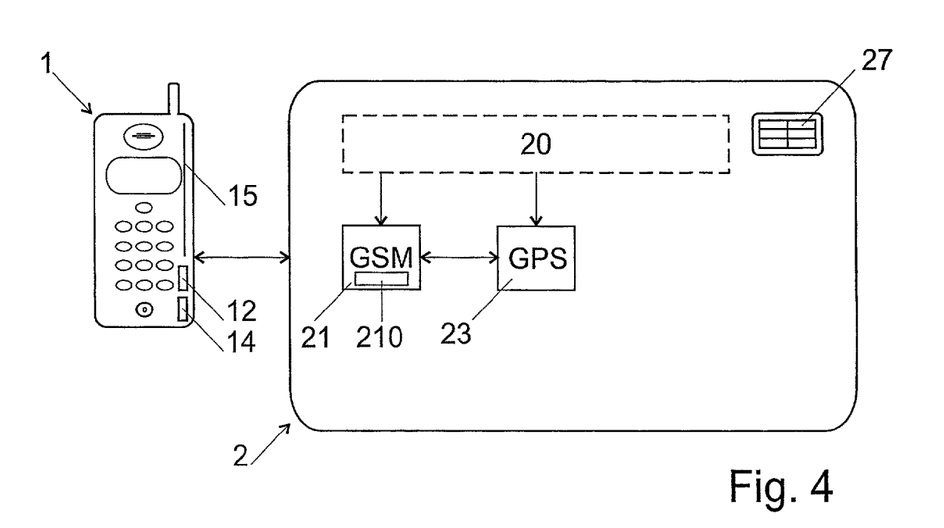
FIG. 4 represents a block diagram with an identification card in a fourth embodiment of the invention and a conventional terminal.

FIG. 4 shows a block diagram of an identification card 2 in a fourth embodiment of the invention. In this embodiment, the card uses the quartz oscillator 12 as well as the GPS antenna 15 of the mobile device 1. Furthermore, it uses a radio-frequency circuit 14 that is also present in the mobile device 1. The signals between the circuit 14 and the digital circuit 23 are also transmitted over the contact area 27. Since the GPS signals are encoded, it is very difficult to generate false signals so that this embodiment also offers a high level of security.

Since the card only comprises the energy-saving components 21 and 22, it is therefore also possible to omit the battery 20 and to use only the battery from the mobile device.

Figure 5:
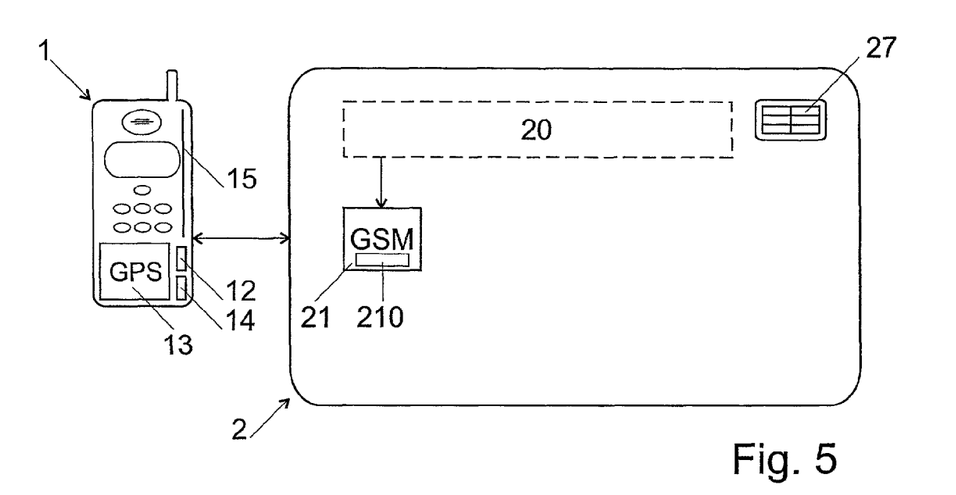
FIG. 5 represents a block diagram with an identification card in a fifth embodiment of the invention and a conventional terminal.

FIG. 5 shows a block diagram of an identification card in a fifth embodiment of the invention. In this embodiment, the card also uses the quartz oscillator 12, the GPS antenna 15 and the radio-frequency circuit 14 of the mobile device 1. Furthermore, it uses at least certain functions of a GPS digital circuit integrated into the mobile device 1, so that the card carries out only a few security-critical GPS operations. These operations can for example also be processed by the GSM processor 21. In this embodiment, the card 2 receives digital and preferably electronically signed and encrypted signals from the circuit 13 that are in a form difficult to generate, and from these signals determines the time and/or location information.

This embodiment has the advantage of needing no hardware adjustments. It can be used for example with a conventional SIM card, for example a JAVA card or an Open-Card card, which has been programmed with a new application allowing the card to access certain signals of the circuit 14.

Figure 6:
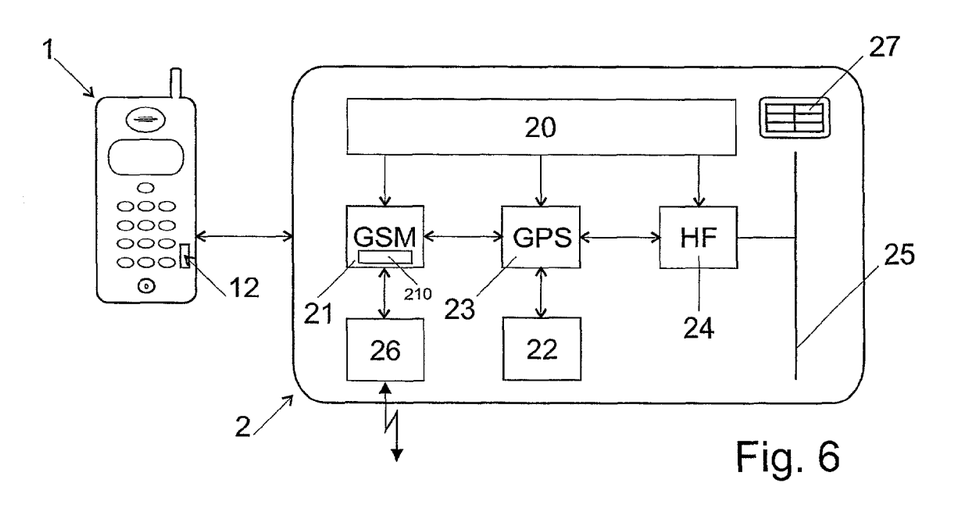
FIG. 6 represents a block diagram with an identification card in a sixth embodiment of the invention and a conventional terminal.

FIG. 6 shows a block diagram of an identification card 2 in a sixth embodiment of the invention. This embodiment corresponds to the embodiment of FIG. 1, except that the card is fitted with an additional contactless interface 26, for example an electromagnetic interface, as for example described in the application PCT/CH97/00237, or a high-frequency interface, for example a so-called BLUETOOTH™ interface. With this interface, the SIM card can communicate contactlessly with external devices, for example to bill processes of external devices.

A contactless interface 26 can also be provided in chip cards according to another of the embodiments of the invention of the FIGS. 2 to 5.

Figure 7:
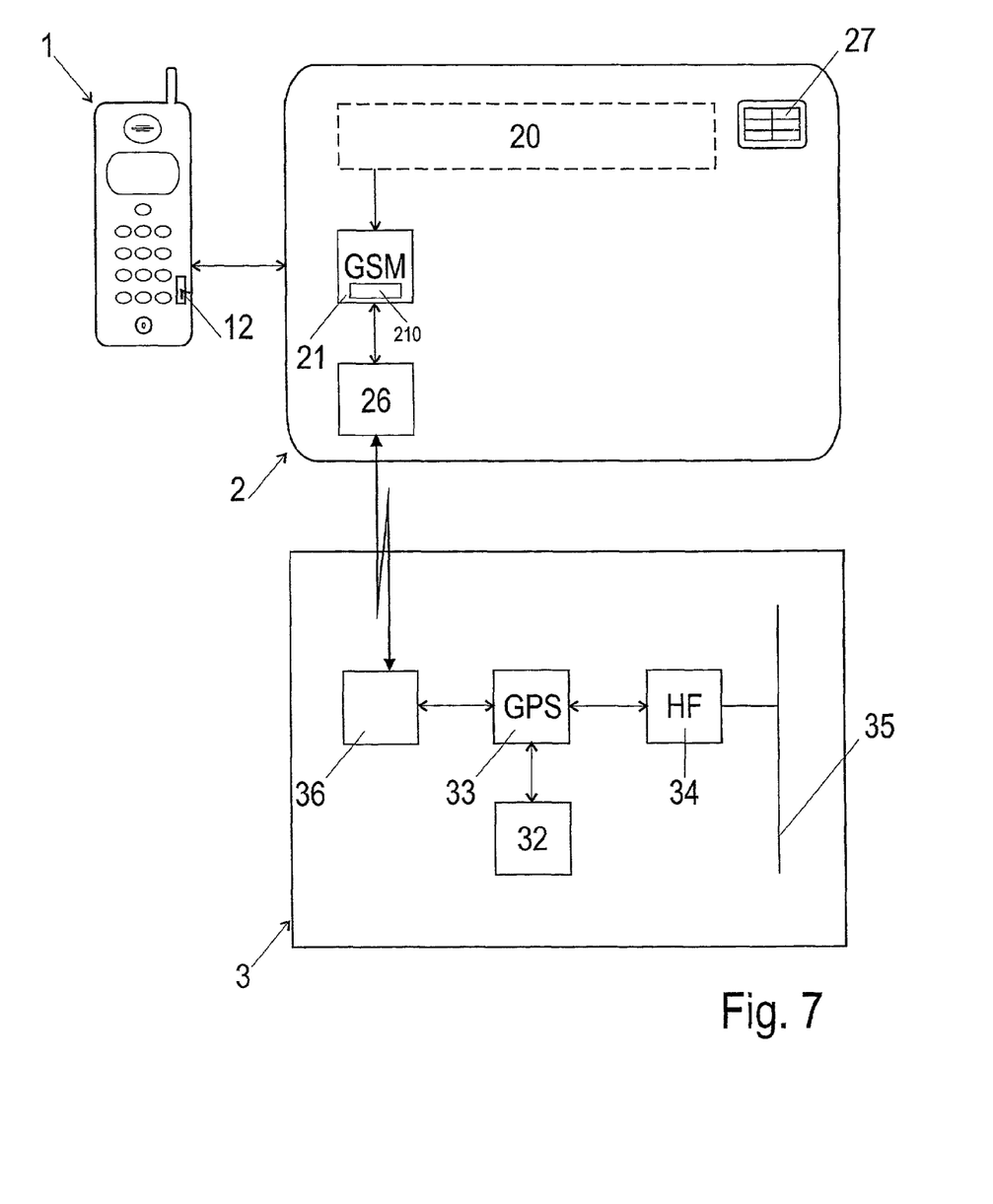
FIG. 7 represents a block diagram with an identification card in a seventh embodiment of the invention, a conventional terminal and a further device.

FIG. 7 shows a block diagram of a system with an identification card 2 in a seventh embodiment of the invention. In this embodiment, the card comprises a conventional processor 21, for example a GSM processor or a multi-purpose JAVA processor, as well as a contactless interface 26, preferably an electromagnetic interface, for example a BLUETOOTH™ interface. The SIM card can connect over this contactless interface with an external device 3 that includes a GPS receiver. In the illustrated example, the external device 3 comprises a contactless interface 36, for example a RFID interface, working with a frequency of 135 KHz, 13.65 MHz, 2.45 GHz or 5.8 GHz, or a BLUETOOTH™ interface, a GPS antenna 35, a radio-frequency front-end circuit 34, a digital GPS circuit 33 and an oscillator 32. The external device further comprises preferably signature means (not represented) for signing the time and location information received with the GPS receiver, to parcel it in receipts and forward these receipts over the interface 36-26 to the chip card 2.

The chip card 2 can then receive these receipts and check whether they have been signed by a device 3 authorized by the network operator. In this case, the chip card can bill processes on the basis of the received time and/or location information with the help of scales of charges in the secure memory part 210.

The external device can preferably comprise means of communication (not represented) with which digital data can be received over a network (not represented). The device 3 can for example comprise a modem or a router with which it can communicate in the Internet. Preferably, the device 3 comprises a DAB (Digital Audio Broadcasting) receiver with which it can receive digital data in broadcast mode. This data can then also be transmitted over the interface 26-36. In this way, updated scales of charges can for example be transmitted over this channel into the SIM card 2.

What is claimed:
1. A system, comprising:
a chip card that is configured for storage of data containing at least user identification data, wherein said chip card comprises:
at least one processor that decodes digital signals sent by a location-determining satellite system to determine time information; and
a contactless interface;
wherein:
said identification data are identification data of a user in a digital communication network; and
duration of calls in said communication network is determined with said time information.

2. The system of claim 1, wherein said processor comprises a digital processor circuit with which said signals can be decoded, as well as a processor in which said user identification data is stored.

3. The system of claim 2, wherein said digital processor circuit is integrated in a chip.

4. The system of claim 2, wherein said chip card comprises an integrated circuit, with which the satellite location-determination signals received by an antenna can be transformed into a form that can be processed by said digital processor circuit.

5. The system of claim 1, wherein said chip card comprises an integrated antenna.

6. The system of claim 2, wherein said chip card comprises an integrated battery to power said digital processor circuit.

7. The system of claim 1, wherein said contactless interface is an electro-magnetic interface.

8. The system of claim 1, wherein said contactless interface is a BLUETOOTH interface.

9. The system of claim 1, wherein the duration of usage of resources not required for traffic handling is determined in the identification card with said time information.

10. The system of claim 1, wherein said chip card comprises at least one scale of charges, in which the fees for using the communication network are indicated.

11. The system of claim 10, wherein said scale of charges can be downloaded from and/or modified by a tariff server in said communication network.

12. The system of claim 11, wherein the chip card is configured for checking electronic signature of received scales of charges.

13. The system of claim 1, wherein the chip card computes amounts to be billed based on said duration of calls, and the computed amounts are debited from a pre-paid account.

14. A system for determining the duration of a process in a chip card, comprising:
a chip card configured to identify a user in a digital telecommunication network, and
a receiver to receive signals of a location-determining satellite and to determine time information from said signals,
wherein said time information is available in said chip card for measuring the duration of a process in said chip card, and
wherein at least certain components of said receiver are integrated in the chip card.

15. The system of claim 14, wherein said time information is calculated in the chip card.

16. The system of claim 14, wherein the chip card comprises a digital processor circuit, with which said time information is calculated.

17. The system of claim 16, wherein said digital processor circuit is integrated in a chip.

18. The system of claim 14, wherein the chip card further comprises an integrated circuit, with which satellite location-determining signals received with an antenna can be transformed into a form that can be processed by said digital processor circuit.

19. The system of claim 14, wherein the chip card further comprises an integrated antenna.

20. The system of claim 16, wherein the chip card further comprises an integrated battery to power said digital processor circuit.

21. The system of claim 14, wherein said time information is determined outside the chip card and transmitted into this chip card.

22. The system of claim 21, wherein said time information is transmitted over a contactless interface.

23. The system of claim 22, wherein said time information is transmitted over an electro-magnetic interface.

24. The system of claim 14, wherein location information is further determined from said signals and wherein this location information is available in said chip card.

25. A system, comprising:
a chip card that is configured for storage of data containing at least user identification data, wherein said chip card comprises:
an integrated antenna;
at least one processor that decodes digital signals sent by a location-determining satellite system to determine time information; and
a contactless interface, wherein said contactless interface is a BLUETOOTH interface.

26. The system of claim 25, wherein said processor comprises a digital processor circuit with which said signals can be decoded, as well as a processor in which said user identification data is stored.

27. The system of claim 26, wherein said digital processor circuit is integrated in a chip.

28. The system of claim 26, wherein said chip card comprises an integrated circuit, with which the satellite location-determination signals received by the antenna can be transformed into a form that can be processed by said digital processor circuit.

29. The system of claim 26, wherein said chip card comprises an integrated battery to power said digital processor circuit.

30. The system of claim 25, wherein said contactless interface is an electro-magnetic interface.

31. The system of claim 25, wherein said identification data are identification data of a user in a digital communication network.

32. The system of claim 31, wherein the duration of calls in said communication network is determined with said time information.

33. The system of claim 31, wherein the duration of usage of resources not required for traffic handling is determined in the identification card with said time information.

34. The system of claim 31, wherein said chip card comprises at least one scale of charges, in which the fees for using the communication network are indicated.

35. The system of claim 34, wherein said scale of charges can be downloaded from and/or modified by a tariff server in said communication network.

36. The system of claim 35, wherein the chip card is configured for checking electronic signature of received scales of charges.

37. The system of claim 32, wherein the chip card computes amounts to be billed based on said duration of calls, and the computed amounts are debited from a pre-paid account.

38. A system, comprising:
a chip card that is configured for storage of data containing at least user identification data, wherein said chip card comprises:
at least one processor, wherein:
said processor decodes digital signals sent by a location-determining satellite system to determine time information, and said processor comprises a digital processor circuit with which said signals can be decoded, as well as a processor in which said user identification data is stored; and an integrated battery to power said digital processor circuit;

wherein:

said identification data are identification data of a user in a digital communication network, and the duration of calls in said communication network is determined with said time information.

39. The system of claim 38, wherein said digital processor circuit is integrated in a chip.

40. The system of claim 38, wherein said chip card comprises an integrated circuit, with which the satellite location-determination signals received by an antenna can be transformed into a form that can be processed by said digital processor circuit.

41. The system of claim 38, wherein said chip card comprises an integrated antenna.

42. The system of claim 38, wherein said chip card comprises a contactless interface.

43. The system of claim 42, wherein said contactless interface is an electro-magnetic interface.

44. The system of claim 42, wherein said contactless interface is a BLUETOOTH interface.

45. The system of claim 38, wherein the duration of usage of resources not required for traffic handling is determined in the identification card with said time information.

46. The system of claim 38, wherein said chip card comprises at least one scale of charges, in which the fees for using the communication network are indicated.

47. The system of claim 46, wherein said scale of charges can be downloaded from and/or modified by a tariff server in said communication network.

48. The system of claim 47, wherein the chip card is configured for checking electronic signature of received scales of charges.

49. The system of claim 38, wherein the chip card computes amounts to be billed based on said duration of calls, and the computed amounts are debited from a pre-paid account.

50. A system, comprising:

a chip card that is configured for storage of data containing at least user identification data, said chip card comprising a processor, wherein:

said processor decodes digital signals sent by a location-determining satellite system to determine time information;

said identification data are identification data of a user in a digital communication network, and the duration of usage of resources not required for traffic handling is determined in an identification card with said time information.

51. The system of claim 50, wherein said processor comprises a digital processor circuit with which said signals can be decoded, as well as a processor in which said user identification data is stored.

52. The system of claim 51, wherein said digital processor circuit is integrated in a chip.

53. The system of claim 51, wherein said chip card comprises an integrated circuit, with which the satellite location-determination signals received by an antenna can be transformed into a form that can be processed by said digital processor circuit.

54. The system of claim 51, wherein said chip card comprises an integrated battery to power said digital processor circuit.

55. The system of claim 50, wherein said chip card comprises an integrated antenna.

56. The system of claim 50, wherein said chip card comprises a contactless interface.

57. The system of claim 56, wherein said contactless interface is an electro-magnetic interface.

58. The system of claim 56, wherein said contactless interface is a BLUETOOTH interface.

59. The system of claim 50, wherein said identification data are identification data of a user in a digital communication network.

60. The system of claim 59, wherein the duration of calls in said communication network is determined with said time information.

61. The system of claim 59, wherein said chip card comprises at least one scale of charges, in which the fees for using the communication network are indicated.

62. The system of claim 61, wherein said scale of charges can be downloaded from and/or modified by a tariff server in said communication network.

63. The system of claim 62, wherein the chip card is configured for checking electronic signature of received scales of charges.

64. The system of claim 60, wherein the chip card computes amounts to be billed based on said duration of calls, and the computed amounts are debited from a pre-paid account.

65. A system, comprising:

a chip card that is configured for storage of data containing at least user identification data, wherein said chip card comprises:

at least one processor that decodes digital signals sent by a location-determining satellite system to determine time information; and wherein said identification data are identification data of a user in a digital communication network;

wherein said identification data further contains at least one scale of charges, in which the fees for using the communication network are indicated, said scale of charges can be downloaded from and/or modified by a tariff server in the communication network, and wherein the chip card is configured for checking electronic signature of received scales of charges.

66. The system of claim 65, wherein said processor comprises a digital processor circuit with which said signals can be decoded, as well as a processor in which said user identification data is stored.

67. The system of claim 66, wherein said digital processor circuit is integrated in a chip.

68. The system of claim 66, wherein said chip card comprises an integrated circuit, with which the satellite location-determination signals received by an antenna can be transformed into a form that can be processed by said digital processor circuit.

69. The system of claim 66, wherein said chip card comprises an integrated battery to power said digital processor circuit.

70. The system of claim 65, wherein said chip card comprises an integrated antenna.

71. The system of claim 65, wherein said chip card comprises a contactless interface.

72. The system of claim 71, wherein said contactless interface is an electro-magnetic interface.

73. The system of claim 71, wherein said contactless interface is a BLUETOOTH interface.

74. The system of claim 65, wherein the duration of calls in said communication network is determined with said time information.

75. The system of claim 74, wherein the chip card computes amounts to be billed based on said duration of calls, and the computed amounts are debited from a pre-paid account.

76. A system for determining the duration of a process in a chip card, comprising:
  a chip card that is configured to be used in a digital telecommunication network to identify a user in said telecommunication network, and
  a receiver that is configured to receive signals of a location-determining satellite and to determine time information from said signals,
  wherein said time information is available in said chip card for measuring the duration of a process in said chip card, and
  wherein the chip card further comprises an integrated circuit, with which satellite location-determining signals received with an antenna can be transformed into a form that can be processed by said digital processor circuit.

77. The system of claim 76, wherein at least certain components of said receiver are integrated in the chip card.

78. The system of claim 76, wherein said time information is calculated in the chip card.

79. The system of claim 76, wherein the chip card comprises a digital processor circuit, with which said time information is calculated.

80. The system of claim 79, wherein said digital processor circuit is integrated in a chip.

81. The system of claim 79, wherein the chip card further comprises an integrated battery to power said digital processor circuit.

82. The system of claim 76, wherein the chip card further comprises an integrated antenna.

83. The system of claim 76, wherein said time information is determined outside the chip card and transmitted into this chip card.

84. The system of claim 83, wherein said time information is transmitted over a contactless interface.

85. The system of claim 84, wherein said time information is transmitted over an electro-magnetic interface.

86. The system of claim 84, wherein said time information is transmitted over a BLUETOOTH interface.

87. The system of claim 76, wherein location information is further determined from said signals and wherein this location information is available in said chip card.

88. A system for determining the duration of a process in a chip card, comprising:
  a chip card that is configured to be used in a digital telecommunication network to identify a user in said telecommunication network, and
  a receiver that is configured to receive signals of a location-determining satellite and to determine time information from said signals,
  wherein said time information is available in said chip card for measuring the duration of a process in said chip card, and
  wherein the chip card further comprises an integrated antenna.

89. The system of claim 88, wherein at least certain components of said receiver are integrated in the chip card.

90. The system of claim 88, wherein said time information is calculated in the chip card.

91. The system of claim 88, wherein the chip card comprises a digital processor circuit, with which said time information is calculated.

92. The system of claim 91, wherein said digital processor circuit is integrated in a chip.

93. The system of claim 91, wherein the chip card further comprises an integrated battery to power said digital processor circuit.

94. The system of claim 88, wherein the chip card further comprises an integrated circuit, with which satellite location-determining signals received with an antenna can be transformed into a form that can be processed by said digital processor circuit.

95. The system of claim 88, wherein said time information is determined outside the chip card and transmitted into this chip card.

96. The system of claim 95, wherein said time information is transmitted over a contactless interface.

97. The system of claim 96, wherein said time information is transmitted over an electro-magnetic interface.

98. The system of claim 96, wherein said time information is transmitted over a BLUETOOTH interface.

99. The system of claim 88, wherein location information is further determined from said signals and wherein this location information is available in said chip card.

100. A system for determining the duration of a process in a chip card, comprising:
  a chip card that is configured to be used in a digital telecommunication network to identify a user in said telecommunication network, and
  a receiver that is configured to receive signals of a location-determining satellite and to determine time information from said signals,
  wherein said time information is available in said chip card for measuring the duration of a process in said chip card, and
  wherein the chip card comprises a digital processor circuit, and wherein the chip card comprises an integrated battery to power said digital processor circuit.

101. The system of claim 100, wherein at least certain components of said receiver are integrated in the chip card.

102. The system of claim 100, wherein said time information is calculated in the chip card.

103. The system of claim 100, wherein said digital processor circuit is integrated in a chip.

104. The system of claim 100, wherein the chip card further comprises an integrated circuit, with which satellite location-determining signals received with an antenna can be transformed into a form that can be processed by said digital processor circuit.

105. The system of claim 100, wherein the chip card further comprises an integrated antenna.

106. The system of claim 100, wherein said time information is determined outside the chip card and transmitted into this chip card.

107. The system of claim 106, wherein said time information is transmitted over a contactless interface.

108. The system of claim 107, wherein said time information is transmitted over an electro-magnetic interface.

109. The system of claim 107, wherein said time information is transmitted over a BLUETOOTH interface.

110. The system of claim 100, wherein location information is further determined from said signals and wherein this location information is available in said chip card.

111. A system for determining the duration of a process in a chip card, comprising:
- a chip card that is configured to be used in a digital telecommunication network to identify a user in said telecommunication network, and
- a receiver that is configured to receive signals of a location-determining satellite and to determine time information from said signals, wherein:
- said time information is available in said chip card for measuring the duration of a process in said chip card,
- said time information is determined outside the chip card and transmitted into this chip card, and
- said time information is transmitted over a contactless interface.

112. The system of claim 111, wherein at least certain components of said receiver are integrated in the chip card.

113. The system of claim 111, wherein said time information is calculated in the chip card.

114. The system of claim 111, wherein the chip card comprises a digital processor circuit, with which said time information is calculated.

115. The system of claim 114, wherein said digital processor circuit is integrated in a chip.

116. The system of claim 114, wherein the chip card further comprises an integrated battery to power said digital processor circuit.

117. The system of claim 111, wherein the chip card further comprises an integrated circuit, with which satellite location-determining signals received with an antenna can be transformed into a form that can be processed by said digital processor circuit.

118. The system of claim 111, wherein the chip card further comprises an integrated antenna.

119. The system of claim 111, wherein said time information is transmitted over an electro-magnetic interface.

120. The system of claim 111, wherein said time information is transmitted over a BLUETOOTH interface.

121. The system of claim 111, wherein location information is further determined from said signals and wherein this location information is available in said chip card.

122. A system, comprising:
a chip card that is configured for storage of data containing at least user identification data, wherein said chip card comprises:
- at least one processor that decodes digital signals sent by a location-determining satellite system to determine time information; and
- a contactless interface;

wherein:
- said identification data are identification data of a user in a digital communication network; and
- the duration of usage of resources not required for traffic handling is determined in the identification card with said time information.

123. A system, comprising:
a chip card that is configured for storage of data containing at least user identification data, wherein said chip card comprises:
- at least one processor that decodes digital signals sent by a location-determining satellite system to determine time information; and
- a contactless interface;

wherein:
- said identification data are identification data of a user in a digital communication network;
- said chip card comprises at least one scale of charges, in which the fees for using the communication network are indicated; and
- said scale of charges can be downloaded from and/or modified by a tariff server in said communication network.

124. A system, comprising:
a chip card that is configured for storage of data containing at least user identification data, wherein said chip card comprises:
- an integrated antenna; and
- at least one processor that decodes digital signals sent by a location-determining satellite system to determine time information;

wherein:
- said identification data are identification data of a user in a digital communication network, and
- the duration of calls in said communication network is determined with said time information.

125. A system, comprising:
a chip card that is configured for storage of data containing at least user identification data, wherein said chip card comprises:
- an integrated antenna; and
- at least one processor that decodes digital signals sent by a location-determining satellite system to determine time information;

wherein:
- said identification data are identification data of a user in a digital communication network, and
- the duration of usage of resources not required for traffic handling is determined in the identification card with said time information.

126. A system, comprising:
a chip card that is configured for storage of data containing at least user identification data, wherein said chip card comprises:
- an integrated antenna; and
- at least one processor that decodes digital signals sent by a location-determining satellite system to determine time information;

wherein:
- said identification data are identification data of a user in a digital communication network,
- said chip card comprises at least one scale of charges, in which the fees for using the communication network are indicated,
- said scale of charges can be downloaded from and/or modified by a tariff server in said communication network, and
- said chip card is configured for checking electronic signature of received scales of charges.

127. A system, comprising:
a chip card that is configured for storage of data containing at least user identification data, wherein said chip card comprises:
- at least one processor, wherein:
  - said processor decodes digital signals sent by a location-determining satellite system to determine time information, and
  - said processor comprises a digital processor circuit with which said signals can be decoded, as well as a processor in which said user identification data is stored; and
- an integrated battery to power said digital processor circuit;

wherein:

said identification data are identification data of a user in a digital communication network, and the duration of usage of resources not required for traffic handling is determined in the identification card with said time information.

\* \* \* \* \*

UNITED STATES PATENT AND TRADEMARK OFFICE
CERTIFICATE OF CORRECTION

PATENT NO. : 9,641,693 B2  
APPLICATION NO. : 09/962901  
DATED : May 2, 2017  
INVENTOR(S) : Ritter Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 4313 days.

Signed and Sealed this  
Seventh Day of February, 2023

Katherine Kelly Vidal  
*Director of the United States Patent and Trademark Office*